(12) United States Patent
Mertens

(10) Patent No.: US 8,374,465 B2
(45) Date of Patent: Feb. 12, 2013

(54) METHOD AND APPARATUS FOR FIELD RATE UP-CONVERSION

(75) Inventor: Mark Jozef Willem Mertens, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 919 days.

(21) Appl. No.: 10/505,499

(22) PCT Filed: Feb. 5, 2003

(86) PCT No.: PCT/IB03/00492
§ 371 (c)(1),
(2), (4) Date: Aug. 24, 2004

(87) PCT Pub. No.: WO03/073757
PCT Pub. Date: Sep. 4, 2003

(65) Prior Publication Data
US 2005/0105000 A1 May 19, 2005

(30) Foreign Application Priority Data
Feb. 28, 2002 (EP) .................................... 02075800

(51) Int. Cl.
*G06K 9/32* (2006.01)
(52) U.S. Cl. .... 382/300; 382/107; 348/699; 375/240.16
(58) Field of Classification Search .................. 382/107, 382/300; 348/699; 375/240.16
See application file for complete search history.

(56) References Cited

U.S. PATENT DOCUMENTS

| 5,214,751 | A |   | 5/1993  | Robert              |
|-----------|---|---|---------|---------------------|
| 5,353,119 | A | * | 10/1994 | Dorricott et al. ........ 348/446 |
| 5,504,831 | A |   | 4/1996  | Sandhu              |
| 5,995,154 | A | * | 11/1999 | Heimburger ........ 348/448 |
| 6,008,865 | A |   | 12/1999 | Fogel               |
| 6,317,460 | B1|   | 11/2001 | Lee                 |
| 6,771,799 | B2|   | 8/2004  | Mertens et al.      |
| 7,101,039 | B2|   | 9/2006  | Maling              |
| 7,995,793 | B2| * | 8/2011  | Mertens ........ 382/103 |
| 2003/0206246 | A1 | | 11/2003 | De Haan et al.    |

FOREIGN PATENT DOCUMENTS

| EP | 0598333 | 5/1994 |
| EP | 0735746 | 10/1996 |

(Continued)

OTHER PUBLICATIONS

Mertens et al., "Motion vector field improvement for picture rate conversion with reduced halo", 2001, SPIE Proceedings of Visual Communications and Image Processing, vol. 4310, 352-362.*

(Continued)

*Primary Examiner* — Chan S Park
*Assistant Examiner* — Katrina Fujita
(74) *Attorney, Agent, or Firm* — Bruce Greenhaus; Duane Morris LLP

(57) ABSTRACT

The interpolation unit comprises: a fetching unit for fetching a first value of a first original pixel of a first input image, based on a first motion vector applicable to the new pixel; a projection unit for projecting a second value of a second original pixel of a second input image, based on a second motion vector applicable to the second original pixel; and a selection unit for assigning the value of the new pixel by means of comparing the first value with the second value.

18 Claims, 7 Drawing Sheets

FOREIGN PATENT DOCUMENTS

Figure 1A:
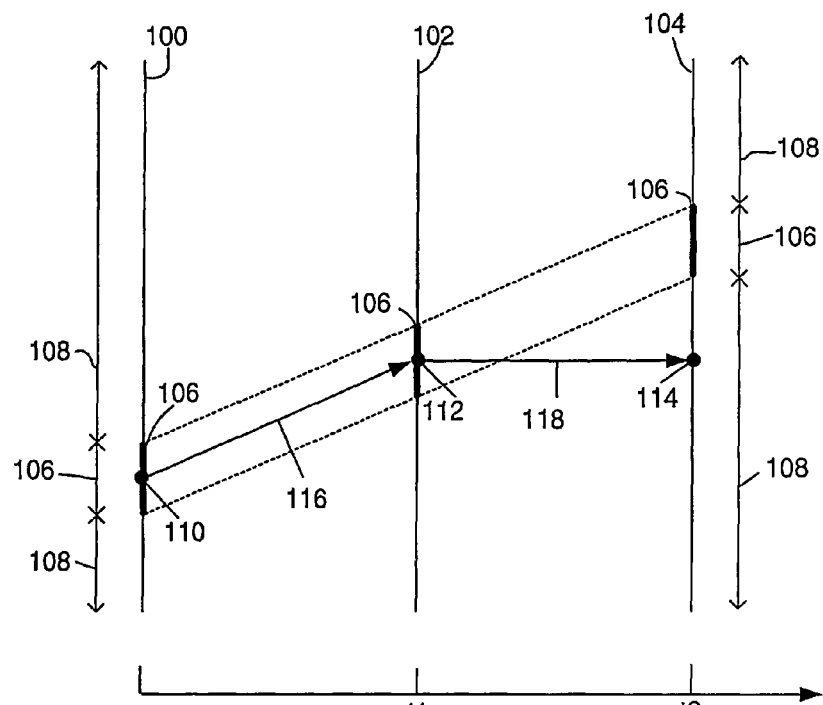

| | | |
|---|---|---|
| EP | 0781041 | 6/1997 |
| EP | 0294282 | 12/1998 |
| GB | 2279531 | 1/1995 |
| WO | WO 96/31069 | 10/1996 |
| WO | WO 99/22520 | 5/1999 |
| WO | WO 00/11863 A1 | 3/2000 |
| WO | WO 01/88852 | 11/2001 |
| WO | WO 01/89225 | 11/2001 |

OTHER PUBLICATIONS

Pelagotti et al., "High quality picture rate up-conversion for video on tv and pc", 1999, Proceedings Philips Conference on Digital Signal Processing.*

"Robust motion-compensated video upconversion", by O. Ojo and G. de Haan, in IEEE Transactions on Consumer Electronics, vol. 43, No. 4, Nov. 1997, pp. 1045-1056.

De Haan, G. et al.: "True-Motion Estimation With 3-D Recursive Search Block Matching", IEEE Transactions on Circuits and Systems for Video Technology, vol. 3, No. 5, Oct. 1993, pp. 368-379.

Fernando, G.M.X et al.: "Motion Compensated Field Rate Conversion for HD-MAC Display", Proceedings of the International Broadcasting Convention, Brighton, Sep. 23-27, 1988, Hitchin, IEE, GB, Sep. 23, 1988, pp. 216-219.

Nojiri, Y. et al.: "HDTV Standards Converter", NHK Laboratories Note, NHK Technical Research Laboratories, Tokyo, Japan, No. 427, Aug. 1, 1994, pp. 1-12.

Zhao, L. et al.: "A New Algorithm for Motion-Compensated Frame Interpolation", Proceedings of the International Symposium on Circuits and Systems (ISCS), Chicago, May 3-6, 1993, IEEE, New York, US, May 3, 1993, vol. 2, pp. 9-12.

Pelagotti, A. et al.: "High Quality Video on Multimedia PCs", IEEE Proceedings on the International Conference on Multimedia Computing and System, Florence, Jun. 1999, pp. 872-876.

De Hann, G.: "IC for Motion-Compensated Deinterlacing, Noise Reduction, and Picture Rate Conversion", IEEE Tr on Consumer Electronics, vol. 45, Aug. 1999, 2 pages.

International Search Report for PCT/IB03/00492 mailed May 26, 2003.

* cited by examiner

METHOD AND APPARATUS FOR FIELD RATE UP-CONVERSION

PRIORITY

This application claims the benefit under 35 U.S.C. §119(a) of an application entitled "UNIT FOR AND METHOD OF UP-CONVERSION" filed in the European Patent Office on Feb. 28, 2002 and assigned Serial No. 02075800.9, the contents of which are hereby incorporated by reference.

The invention relates to a method of up-conversion by assigning a value of a new pixel of a new image at a temporal position between successive input images on basis of fetching a first value of a first original pixel from a first one of the input images based on a first motion vector applicable to the new pixel.

The invention further relates to an interpolation unit for up-conversion by assigning a value of a new pixel of a new image at a temporal position between successive input images on basis of fetching a first value of a first original pixel from a first one of the input images based on a first motion vector applicable to the new pixel.

The invention further relates to an up-conversion unit for up-conversion of successive input images comprising:
  a motion estimation unit for calculating motion vector fields on basis of the successive input images; and
  an interpolation unit for up-conversion by assigning a value of a new pixel of a new image at a temporal position between the successive input images on basis of fetching a first value of a first original pixel from a first one of the input images based on a first motion vector of one of the motion vector fields and being applicable to the new pixel.

The invention further relates to an image processing apparatus comprising:
  receiving means for receiving successive input images; and
  such an up-conversion unit for up-conversion of the successive input images.

A unit of the kind described in the opening paragraph is known from the article "Robust motion-compensated video upconversion", by O. Ojo and G. de Haan, in IEEE Transactions on Consumer Electronics, Vol. 43, No. 4, November 1997, pp. 1045-1056. This article describes that based on a motion vector of a motion vector field being determined for an image to be interpolated at a temporal position between successive input images, values of pixels are fetched from the successive input images. By combining these fetched values a value of a new pixel of the image to be interpolated is determined. Combining might be averaging or taking the median value from the set of values. With this known unit artifacts are introduced in so-called occlusion areas: where background objects of the scene being captured are covered or uncovered by moving foreground objects. A typical type of artifact which can be observed in the occlusion area is called halo: the background is locally distorted. This is caused by the fact that the motion vectors used for the fetching and hence interpolations are incorrect.

It is an object of the invention to provide a method of the kind described in the opening paragraph which provides up-converted images with relatively few artifacts.

The object of the invention is achieved in that the method further comprises:
  a projection step of projecting a second value of a second original pixel, selected from the first one of the input images or from a further one of the input images, based on a second motion vector applicable to the second original pixel; and
  an update step of conditionally updating the value of the new pixel by comparing the value of the new pixel with the second value.

Motion vector fields to be applied for up-conversion can be calculated at the following temporal positions: at the temporal position of the new image to be interpolated, at the temporal position corresponding to an original image which is preceding the new image to be interpolated and at the temporal position corresponding to another original image, which is succeeding the new image to be interpolated. In the unit described in the above cited prior art the motion vector field being used is calculated for the temporal position of the new image to be interpolated. A major advantage of such a motion vector field is that there is a motion vector for each pixel of the new image to be interpolated, i.e. there are no holes. Values of original pixels can be fetched based on these motion vectors. Hence the interpolation is straight forward. Another strategy to come to an interpolated image is by means of applying a motion vector field corresponding to the temporal position of an original image. In that case values of pixels of that original image are projected to the new image to be interpolated. However the probability is high that there are pixels of the new image to be interpolated for which there are no projections, i.e. there will be holes in the assignments. Or in other words, not for each pixel of the new image a value is projected. Besides that, there might be double assignments to some of the pixels of the new image to be interpolated. An advantage of applying a motion vector field corresponding to an original image is that it in most cases better represents actual movements of objects than the motion vector field corresponding to the new image to be interpolated.

Hence, the method according to the invention combines the fetching of values of pixels from at least one original image on basis of a motion vector field corresponding to the new image to be interpolated with projecting values of pixels from at least one original image on basis of a motion vector field corresponding to that original image.

An embodiment of the method according to the invention is characterized in that in the update step the value of the new pixel is updated into an updated value if the absolute difference between the value of the new pixel and the second value is larger than a predetermined threshold and that then the updated value is made equal to the second value. The value of the new pixel corresponds to the value of the second value, which is based on projection, if the second value differs more than a predetermined threshold from the value which is based on fetching. If the second value differs less than the predetermined threshold from the value which is based on fetching, i.e. they are substantially mutually equal then it is not relevant which of the two values is selected to be the value of the new pixel. In this case the value which is based on fetching is selected. In the case that there is no appropriate second value then the value which is based on fetching is selected too.

Another embodiment of the method according to the invention further comprises a second projection step of projecting a third value of a third original pixel, selected from the first one of the input images or the further one of the input images, with the second original pixel and the third original pixel belonging to different input images, the projecting based on a third motion vector applicable to the third original pixel and that the update step of conditionally updating the value of the new pixel is based on comparing the value of the new pixel with the second value and with the third value. The value of the new pixel is determined on basis of at least one fetched value and on a first projected value from a pixel of a succeeding image and a second projected value from another pixel of a preceding image.

An embodiment of the method according to the invention is characterized in that in the update step the value of the new pixel is updated into an updated value if the value of the new pixel differs from the median value of a set of values comprising the value of the new pixel, the second value and the third value and that then the updated value is made equal to the median value of the set. An advantage of the median operator is that it is relatively robust. Besides halo, another type of artifact which is very common in up-converted images is caused by mixing foreground and background objects. And another type of artifact is characterized in that foreground objects are smaller in the up-converted images than in the original images. By means of applying this embodiment according to the invention these artifacts hardly occur.

Another embodiment of the method according to the invention is characterized in that the value of the new pixel is determined on basis of combining the first value with a further value of a further original pixel being fetched from the further one of the input images based on the motion vector applicable to the new pixel. The fetching can be unidirectional or bi-directional. A value of a pixel can be fetched from a preceding original image or a succeeding original image.

It is a further object of the invention to provide an interpolation unit of the kind described in the opening paragraph which provides up-converted images with relatively few artifacts. This object of the invention is achieved in that the interpolation unit comprises:
 a projection unit for projecting a second value of a second original pixel, selected from the first one of the input images or from a further one of the input images, based on a second motion vector applicable to the second original pixel; and
 an update unit for conditionally updating the value of the new pixel by comparing the value of the new pixel with the second value.

Modifications of the interpolation unit and variations thereof may correspond to modifications and variations thereof of the method described and of the image processing apparatus described.

Figure 1B:
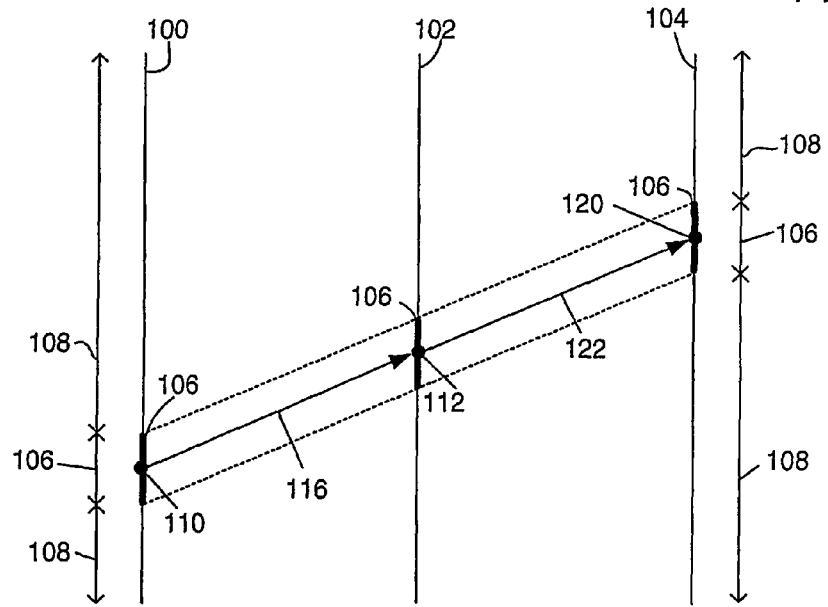
Figure 1C:
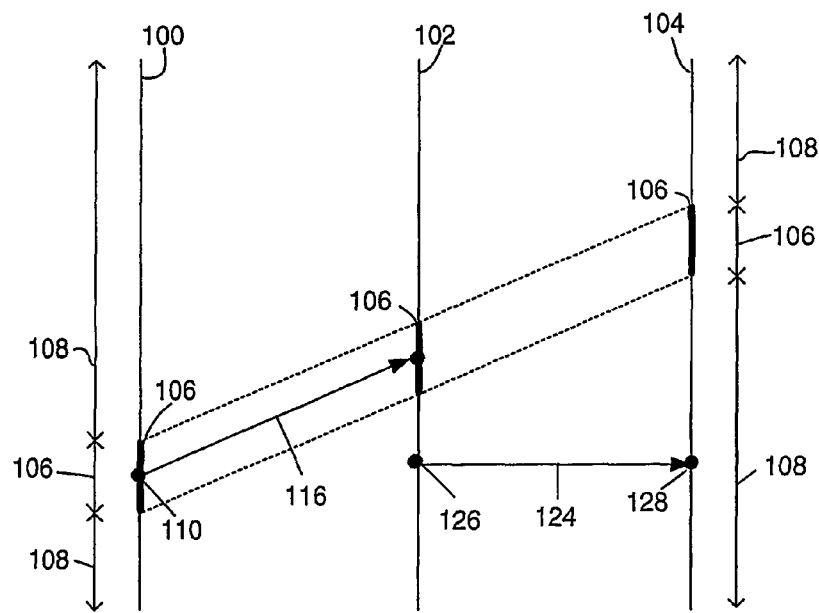
Figure 2:
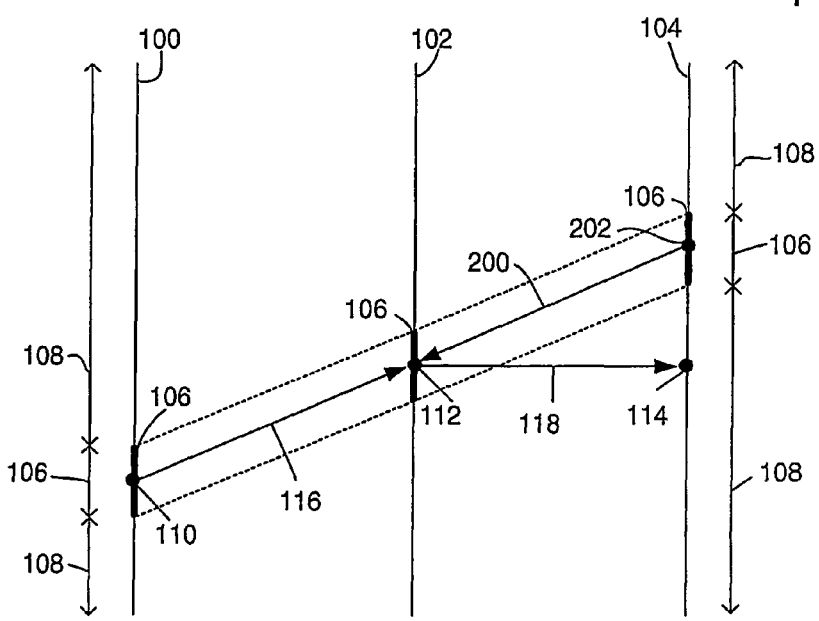
Figure 3A:
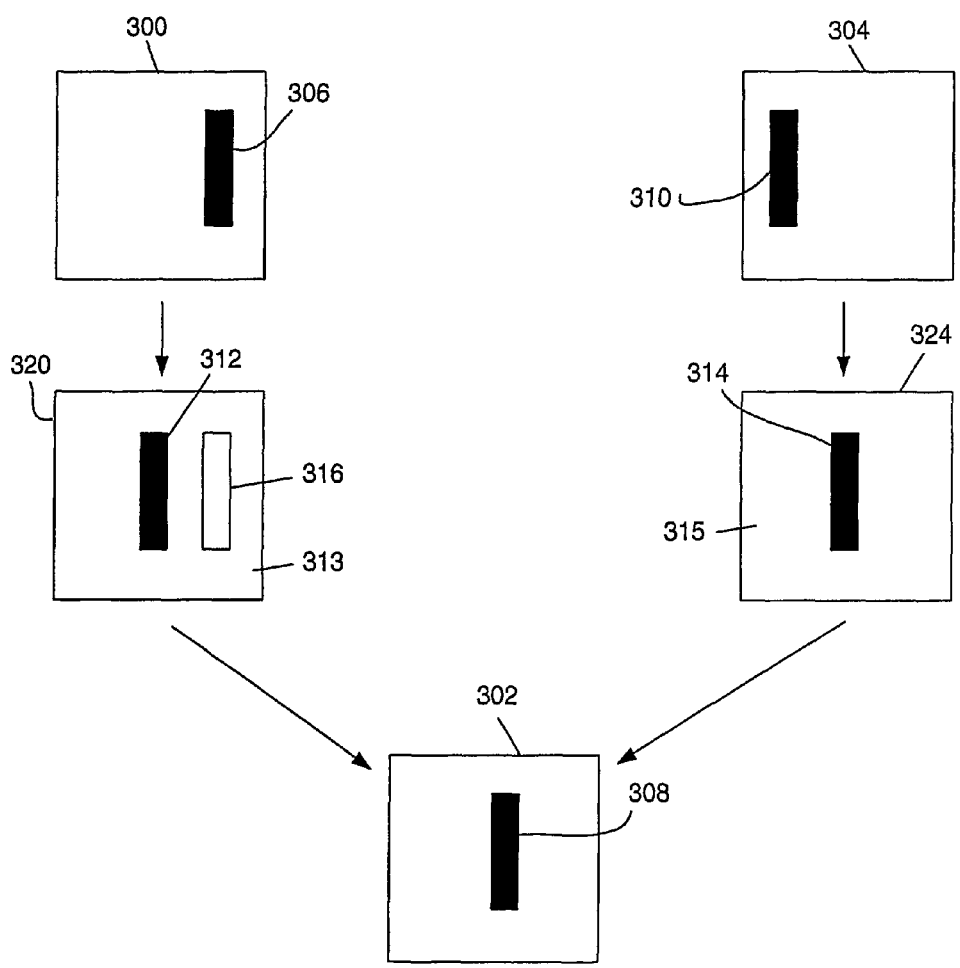
Figure 3B:
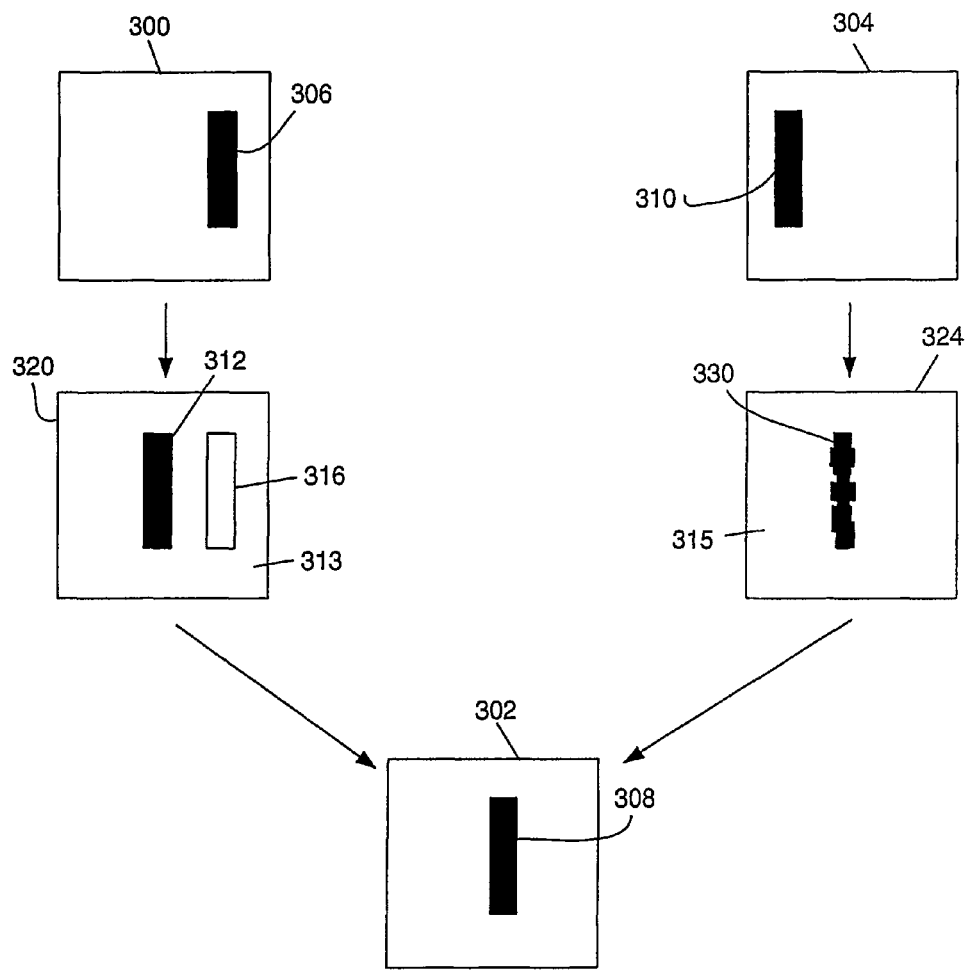
Figure 3C:
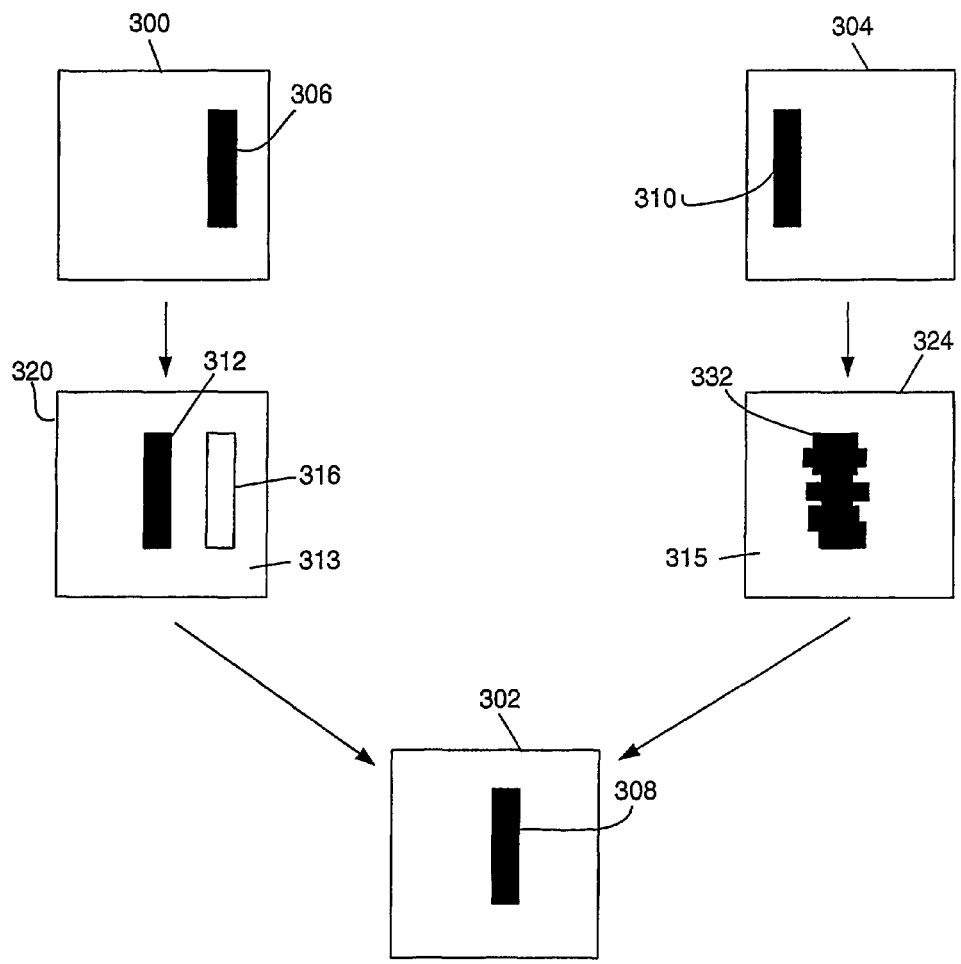
Figure 4A:
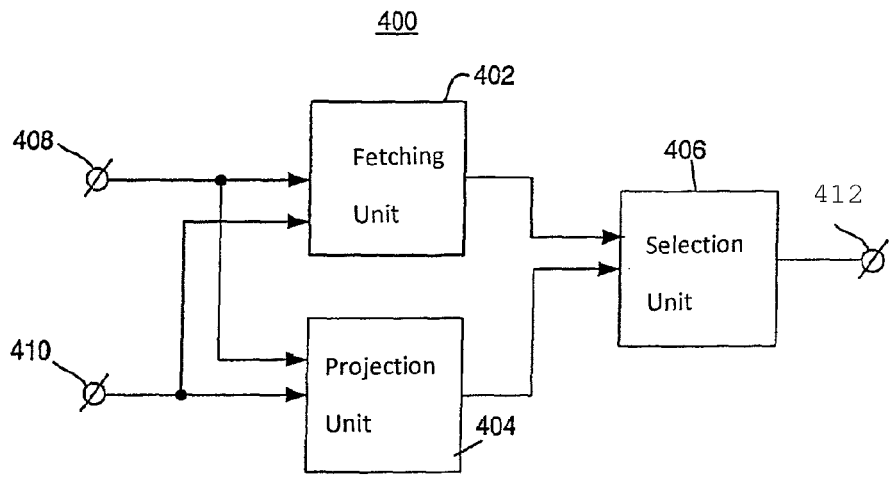
Figure 4B:
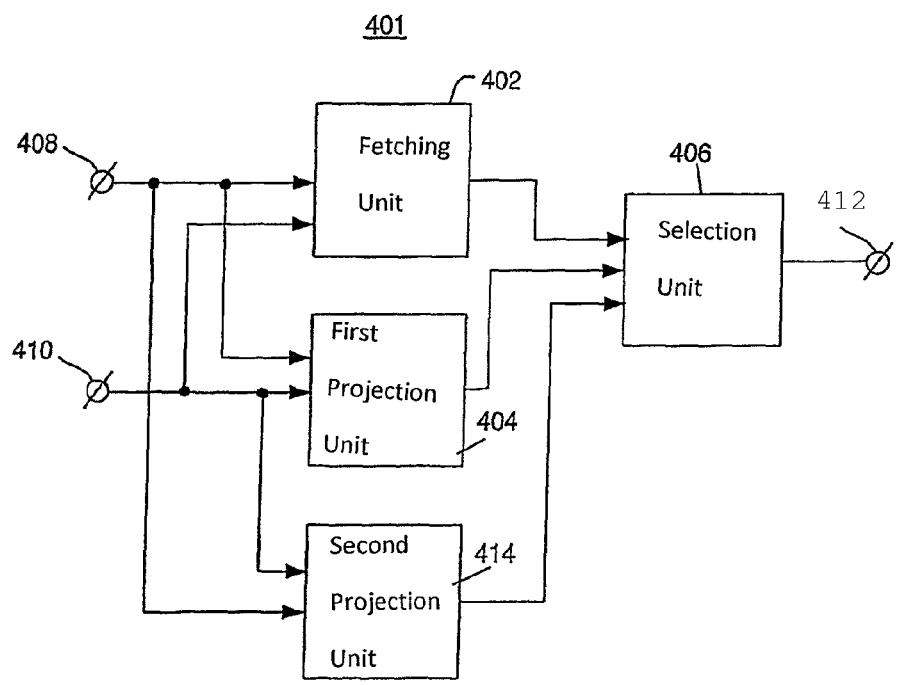
Figure 5:
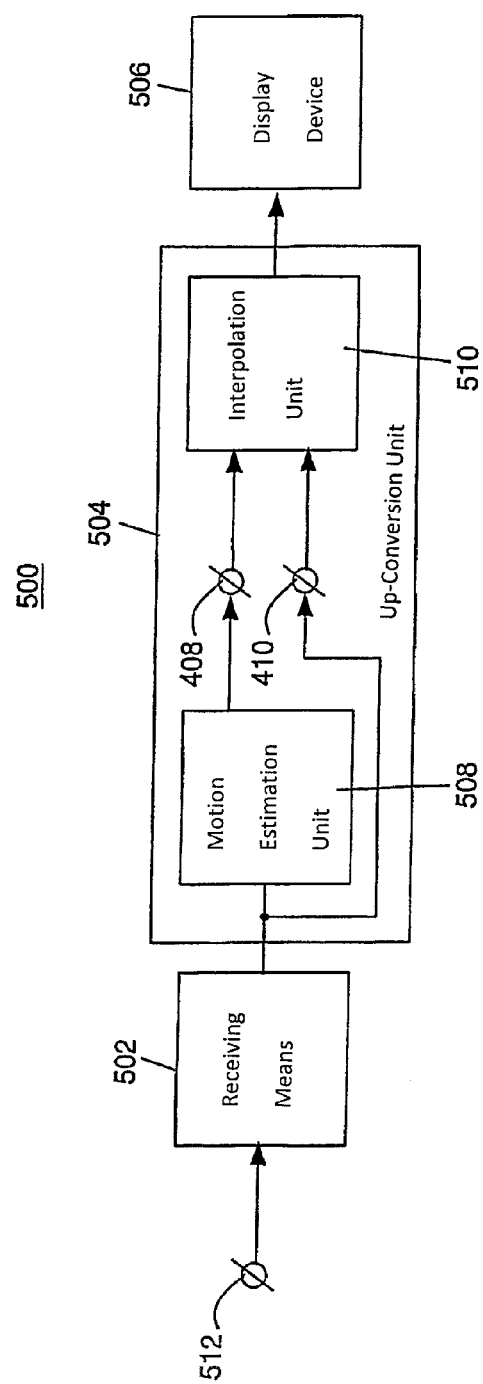

These and other aspects of the interpolation unit, of the up-conversion unit, of the method and of the image processing apparatus according to the invention will become apparent from and will be elucidated with respect to the implementations and embodiments described hereinafter and with reference to the accompanying drawings, wherein:

FIG. 1A schematically shows the method whereby a first value of an appropriate pixel is projected and a second value of an inappropriate pixel is fetched;

FIG. 1B schematically shows the method whereby a first value of an appropriate pixel is projected and a second value of an appropriate pixel is fetched;

FIG. 1C schematically shows the method whereby no value of an appropriate pixel is projected but only a value of an appropriate pixel is fetched;

FIG. 2 schematically shows the method whereby a first value of an appropriate pixel is projected from a first image, a second value of an inappropriate pixel is fetched and a third value of an appropriate pixel is projected from a second image;

FIG. 3A schematically shows the method by means of two-dimensional representations of images in the case that the motion vector fields for two temporal positions are correct;

FIGS. 3B and 3C schematically show the method by means of two-dimensional representations of images in the case that the motion vector field is correct for a temporal position and incorrect for another temporal position;

FIG. 4A schematically shows an embodiment of the interpolation unit based on projection from one input image;

FIG. 4B schematically shows an embodiment of the interpolation unit based on projection from two input images; and FIG. 5 schematically shows an embodiment of the image processing apparatus.

Corresponding reference numerals have same or like meaning in all of the Figs.

FIG. 1A schematically shows the method whereby a first value of an appropriate pixel 110 is projected and a second value of an inappropriate pixel 114 is fetched. In FIG. 1A three images 100, 102 and 104 are depicted corresponding to the respective temporal positions t0, t1 and t2. Two of the three images 100 and 104 are original images and the third image 102 is an image to be interpolated based on the two original images 100 and 104. The images 100, 102 and 104 represent a foreground object 106 which is moving in an upwards direction in front of a stationary background 108. A motion vector field is determined for an original image 100. One motion vector 116 of this motion vector field is depicted. This motion vector corresponds with the motion of the foreground object 106 in the time interval between the temporal positions t0 and t1. Another motion vector field is determined for the image to be interpolated 102. One motion vector 118 of this latter motion vector field is depicted. This motion vector 118 is incorrect, i.e. it does not correspond to the movement of the foreground object 106. But this motion vector is equal to the null vector, i.e. corresponding to no motion.

The goal is to determine the values of the pixels, e.g. 112 of the image to be interpolated 102. This is achieved by applying the method according to the invention. That means that the value of pixel 114 from an original image 104 is fetched. Since pixel 112 corresponds to foreground 106 and pixel 114 corresponds to background 108, the probability is low that the value of pixel 114 is appropriate to be used for pixel 112. Then the value of pixel 110 of another original image 100 is projected. Since pixel 112 corresponds to foreground 106 and pixel 110 also corresponds to foreground 106, the probability is high that the value of pixel 110 is appropriate to be used for pixel 112. A next step is comparing the values of the pixels 114 and 110: the difference between the values of the pixels 114 and 110 is calculated and compared with a predetermined threshold. Because the absolute difference is higher than the predetermined threshold, the value of pixel 110 is selected as the value for pixel 112. Note that in this example the "fetched" pixel 114 and the "projected" pixel 110 do not belong to the same original image. However, the opposite might also be true.

FIG. 1B schematically shows the method whereby a first value of an appropriate pixel 110 is projected and a second value of an appropriate pixel 120 is fetched. The example shown in FIG. 1B is quite similar to the example described in connection with FIG. 1A. However in this case the value of the pixel 120 is also appropriate. This value is fetched based on the motion vector 122. After the fetch of the value of the pixel 120 and the projection of the value of pixel 110, the comparison is made between the two values. Because the values are substantially mutually equal, it does not really matter which of the two values is selected to be assigned to pixel 112. In this example the value of pixel 120 is selected. However selection of the value of pixel 110 would also have been appropriate. An average of the two values to calculate the value to assign to pixel 112 is a third alternative.

FIG. 1C schematically shows the method whereby no value of an appropriate pixel is projected but only a value of an appropriate pixel is fetched 128. In this case the goal is to determine the value of the pixel 126 of the image to be interpolated 102. Pixel 126 corresponds to a portion of the background 108 which is uncovered in the time interval between t0 and t1. As a consequence there is no motion vector in the motion vector field corresponding to the original image 100 which projects to pixel 126. Hence the value to be assigned to pixel 126 is equal to the value of the pixel 128 fetched from original image 104 on basis of motion vector 124. Note that the probability is high that the value of the pixel 128 is appropriate, since both pixels 126 and 128 correspond to background. In this case there is no comparison step between a value from a "projected" pixel and a "fetched" pixel 128.

FIG. 2 schematically shows the method whereby a first value $P_1$ of an appropriate pixel 110 is projected from a first image 100, a second value F of an inappropriate pixel 114 is fetched and a third value $P_2$ of an appropriate pixel 202 is projected from a second image 104. The example shown in FIG. 2 is quite similar to the example described in connection with FIG. 1A. However in this case there is a second motion vector field being available for the second original image 104. Motion vector 200 is one of the motion vectors of this second motion vector field. The value to be assigned to pixel 112 is determined by comparing the three values, $P_1$, F and $P_2$. This is done by applying a median operator. The value $P_o$ to be assigned to pixel 112 is calculated by applying Equation 1:

$$P_o = \text{Median}(P_1, P_2, F) \quad (1)$$

A median operator can be seen as an outlier rejector. In the case of 3 elements a median operator selects one of the two elements which have a minimal or no difference in relation to each other. In this case the value of pixel 110 or pixel 202 is assigned to pixel 112.

In connection with FIG. 1C it is described that there might be no projection values for each of the pixels of the image to be interpolated 102. In order to be able to apply Equation 1 dummy values can be used. Suppose there is no valid first value $P_1$ then this value is set to a predetermined minimum value. The result is that this first value $P_1$ is not selected by means of the median operator. A similar approach is taken for the third value $P_2$. The probability that both the first value $P_1$ and the third value $P_2$ are invalid is negligible. But if they are both invalid then the fetched value is used.

FIG. 3A schematically shows the method by means of two-dimensional representations of images 300, 302, 304 in the case that the motion vector fields for two temporal positions are correct. In fact the cases described in connection with FIG. 1A and FIG. 1C are illustrated by means of another representation. Original image 300 is part of a sequence of original images being captured of a scene of an object moving in front of a stationary background. A portion 306 of the image 300 corresponds to the object. Original image 304 is also part of the sequence of original images and is the successor of original image 300. A portion 310 of the original image 304 corresponds to the object. The goal is to calculate an new image 302 at a temporal position in between the temporal positions of the original images 300 and 304, respectively. This is achieved by applying the method according to the invention:

First pixels of original image 300 are projected based on the motion vector field which is applicable to the original image 300. The result is the intermediate pixel matrix 320. Most of the pixels 313 of the pixel matrix 320 have a value corresponding to the background. A portion of the pixels 312 have a value corresponding to the moving object. And a third portion of the pixels 316 have a dummy value which has been set because there is no valid projected pixel value.

Then pixels of original image 304 are fetched based on the motion vector field which is applicable to the new image 302. The result is the intermediate pixel matrix 324. Most of the pixels 315 of the pixel matrix 324 have a value corresponding to the background. A portion of the pixels 314 have a value corresponding to the moving object.

Corresponding pixels of the two pixel matrices 320 and 324 are compared in order to assign values of the pixels of the image to be interpolated 302. This is done as described in connection with FIG. 1A. An exception is made for the pixels corresponding to portion 316. For these pixels an approach is taken as described in connection with FIG. 1C, i.e. the values of "fetched" pixels are taken.

FIGS. 3B and 3C schematically show the method by means of two-dimensional representations of images 300, 302 and 304 in the case that the motion vector field is correct for a temporal position and incorrect for another temporal position. In FIG. 3B it can be seen that the intermediate pixel matrix 324, which is made by means of fetching values of pixels on basis of a motion vector field applicable to image 302 is not correct: portion 330 has a irregular shape. This is caused by the fact that the motion vector field applicable to image 302 is not correct. Portion 330 is too small. However by means of applying the method according to the invention a correct new image 302 is made.

In FIG. 3C it can be seen that again the intermediate pixel matrix 324 is not correct: portion 332 has a irregular shape. This is also caused by the fact that the motion vector field applicable to image 302 is not correct. Now, portion 332 is too large. By means of applying the method according to the invention a correct new image 302 is made.

FIG. 4A schematically shows an embodiment of the interpolation unit 400 based on projection from one input image and fetching. On the first input connector 408 of the interpolation unit 400 a series of consecutive images is provided. On the second input connector 410 of the interpolation unit 400 a series of motion vector fields is provided. The interpolation unit 400 provides at its output connector a series of output images. Some of the output images are direct copies of the input images. Other output images are calculated on basis of the input images by means of up-conversion. By up-conversion a value of a new pixel of a new image at a temporal position between successive input images is assigned on basis of at least one value of a pixel of an input image. The interpolation unit 400 comprises:

a fetching unit 402 for fetching a first value of a first original pixel from a first one of the input images based on a first motion vector applicable to the new pixel, a projection unit 404 for projecting a second value of a second original pixel, selected from the first one of the input images or a further one of the input images, based on a second motion vector applicable to the second original pixel; and a selection unit 406 for assigning the value of the new pixel by means of comparing the first value with the second value.

The working of the interpolation unit 400 corresponds to the method described in connection with FIGS. 1A, 1B and 1C.

FIG. 4B schematically shows an embodiment of the interpolation unit 401 based on projection from two input images. The interpolation unit 401 comprises:

- a fetching unit 402 for fetching a first value of a first original pixel from a first one of the input images based on a first motion vector applicable to the new pixel to be assigned,
- a first projection unit 404 for projecting a second value of a second original pixel of a first one of the input images based on a second motion vector applicable to the second original pixel;
- a second projection unit 414 for projecting a third value of a third original pixel of a second one of the input images based on a third motion vector applicable to the third original pixel; and
- a selection unit 406 for assigning the value of the new pixel by means of comparing the first value with the second value and the third value.

The working of the interpolation unit 401 corresponds to the method described in connection with FIG. 2.

Optionally values of multiple pixels are fetched in the examples described in connection with the Figs. That means e.g. that also from a second one of the input images a value is fetched. These multiple values can be combined as described in the article "Robust motion-compensated video upconversion", by O. Ojo and G. de Haan in IEEE Transactions on Consumer Electronics, Vol. 43, No. 4, November 1997, pp. 1045-1056.

Optionally the interpolation unit 400, 401 according to the invention comprises an occlusion detector. The probability of correctness of motion vectors can be determined by means of the occlusion detector. A value of a pixel related to a probably incorrect motion vector could be disregarded. This allows e.g. to control the fetching: fetch from a succeeding or a preceding image. An approach for calculating an occlusion map on basis of a motion vector field is described in the patent application which is entitled "Problem area location in an image signal" and published under number WO0011863. In that patent application is described that an occlusion map is determined by means of comparing neighboring motion vectors of a motion vector field. It is assumed that if neighboring motion vectors are substantially equal, i.e. if the absolute difference between neighboring motion vectors is below a predetermined threshold, then the groups of pixels to which the motion vectors correspond, are located in a no-covering area. However if one of the motion vectors is substantially larger than a neighboring motion vector, it is assumed that the groups of pixels are located in either a covering area or an uncovering area. The direction of the neighboring motion vectors determines which of the two types of area.

FIG. 5 schematically shows an embodiment of the image processing apparatus 500 comprising:

- receiving means 502 for receiving a signal representing images to be displayed after some processing has been performed. The signal may be a broadcast signal received via an antenna or cable but may also be a signal from a storage device like a VCR (Video Cassette Recorder) or Digital Versatile Disk (DVD). The signal is provided at the input connector 512.
- an up-conversion unit 504 comprising:
- a motion estimation unit 508 for calculating motion vector fields. This motion estimation unit might be the motion estimation unit which is known from the article "True-Motion Estimation with 3-D Recursive Search Block Matching" by G. de Haan et. al. in IEEE Transactions on circuits and systems for video technology, vol. 3, no. 5, October 1993, pages 368-379; and
- an interpolation unit 510 as described in connection with FIG. 4A or FIG. 4B.
- a display device 506 for displaying the output images of the up-conversion unit 504. This display device 506 is optional.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer or a TV. In the unit claims enumerating several means, several of these means can be embodied by one and the same item of hardware.

The invention claimed is:

1. A method of up-conversion of a first input image and a later in time input image to determine pixel values for an interpolated image between the first input image and the later in time input image comprising the steps of:
   - assigning a first value of a new pixel of an interpolated image at a temporal position between the input images by fetching a value of a first original pixel from the later in time input image based on a first motion vector;
   - projecting a second value of an original pixel from the first input image and the later in time input image to the new pixel of the interpolated image, based on a second motion vector;
   - projecting a third value of an original pixel from the later in time input image to the new pixel of the interpolated image, based on a third motion vector;
   - applying an algorithm to the first value, second value, and third value to obtain a result; and
   - updating the value of the new pixel of an interpolated image to equal the result.

2. A method as claimed in claim 1, wherein the result is set to the second value if the absolute difference between the first value and the second value is larger than a predetermined threshold.

3. A method as claimed in claim 1, wherein the result is set to the third value if the absolute difference between the first value and third value is larger than a predetermined threshold.

4. A method as claimed in claim 1, wherein the result is the median value of the set comprising the first value, the second value, and the third value.

5. An interpolation unit for up-conversion of successive input images that include a first input image and a later in time input image, the interpolation unit comprising:
   - a fetching unit configured to assign a first value of a new pixel of an interpolated image at a temporal position between the input images by fetching a value of a first original pixel from the later in time input image based on a first motion vector;
   - a projection unit for projecting a second value of an original pixel from the first input image to the new pixel of the interpolated image, based on a second motion vector and for projecting a third value of an original pixel from the later in time input image to the new pixel of the interpolated image based on a third motion vector; and
   - an update unit for conditionally updating the value of the new pixel of the interpolated image based on an algorithm applied to the first value, the second value, and the third value.

6. An interpolation unit as claimed in claim 5, wherein the update unit is configured to update the value of the new pixel of the interpolated image by setting the value of the new pixel of the interpolated image equal to the second value if the absolute difference between the first value and the second value is larger than a predetermined threshold.

7. An interpolation unit as claimed in claim 5, wherein the update unit is configured to update the value of the new pixel of the interpolated image by setting the value of the new pixel of the interpolated image equal to the third value if the absolute difference between the first value and the third value is larger than a predetermined threshold.

8. An interpolation unit as claimed in claim 5, wherein the algorithm comprises determining a median value of a set of values that comprises the first value, the second value, and the third value.

9. An up-conversion unit for up-conversion of successive input images comprising:
 a motion estimation unit for calculating motion vector fields on basis of a first input image and a later in time input image; and
 an interpolation unit for up-conversion by assigning a value of a new pixel of an interpolated image at a temporal position between the input images on the basis of fetching a first value of a first original pixel from the later in time input image based on a first motion vector of one of the motion vector fields and being applicable to the new pixel of the interpolated image, wherein the interpolation unit comprises:
 a projection unit for projecting a second value of an original pixel from the first input image to the new pixel of the interpolated image based on a second motion vector and for projecting a third value of an original pixel from the later in time input image to the new pixel of the interpolated image based on a third motion vector; and
 an update unit for conditionally updating the value of the new pixel of the interpolated image based on an algorithm applied to the first value, the second value, and the third value.

10. An up-conversion unit as claimed in claim 9, wherein the update unit is configured to update the value of the new pixel of the interpolated image by setting the value of the new pixel of the interpolated image equal to the second value if the absolute difference between the first value and the second value is larger than a predetermined threshold.

11. An up-conversion unit as claimed in claim 9, wherein the update unit is configured to update the value of the new pixel of the interpolated image by setting the value of the new pixel of the interpolated image equal to the third value if the absolute difference between the first value and the third value is larger than a predetermined threshold.

12. An up-conversion unit as claimed in claim 9, wherein the algorithm comprises determining a median value of a set comprising the first value, the second value, and the third value.

13. An image processing apparatus comprising:
 receiving means for receiving a first input image and a later in time input image; and an interpolation unit for up-conversion by assigning a value of a new pixel of an interpolated image at a temporal position between the input images by fetching a first value of a first original pixel from the later in time input image based on a first motion vector of one of the motion vector fields and being applicable to the new pixel of the interpolated image, wherein the interpolation unit includes:
 a projection unit for projecting a second value of an original pixel from the first input image to the new pixel of the interpolated image, based on a second motion vector and for projecting a third value of an original pixel from the later in time input image to the new pixel of the interpolated image based on a third motion vector; and
 an update unit for conditionally updating the value of the new pixel of the interpolated image based on an algorithm applied to the first value, the second value, and the third value.

14. An image processing apparatus as claimed in claimed 13, further comprising a display means for displaying the interpolated image.

15. An image processing apparatus as claimed in claimed 14, wherein the display means is a TV.

16. An image processing apparatus as claimed in claim 13, wherein the update unit is configured to update the value of the new pixel of the interpolated image by setting the value of the new pixel of the interpolated image equal to the second value if the absolute difference between the first value and the second value is larger than a predetermined threshold.

17. An up-conversion unit as claimed in claim 13, wherein the update unit is configured to update the value of the new pixel of the interpolated image by setting the value of the new pixel of the interpolated image equal to the third value if the absolute difference between the first value and the third value is larger than a predetermined threshold.

18. An up-conversion unit as claimed in claim 13, wherein the algorithm comprises determining a median value of a set comprising the first value, the second value, and the third value.

* * * * *